X 0009580
G. BOYD.
Seed-Planter.
Patented Apr 11, 1836.
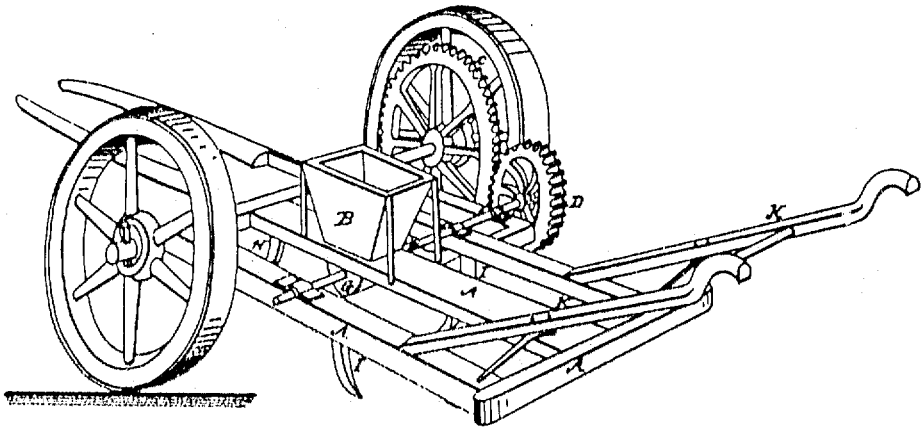
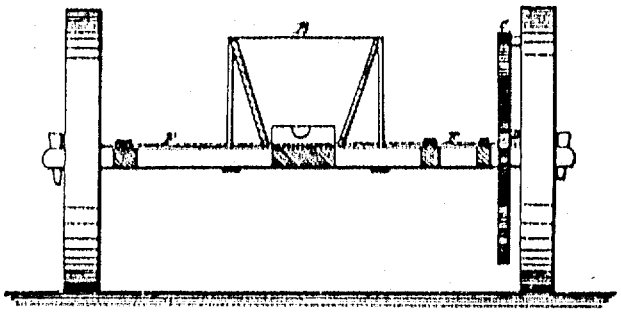
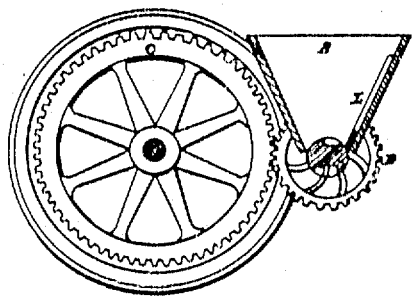
AM. PHOTO-LITHO. CO. N.Y. (OSBORNE'S PROCESS)

George C. Boyd [illegible] New London [illegible]
Letters Patent

The schedule referred to in these Letters Patent and making part of the
same containing a description in the words of the said George C Boyd
himself of his improvement in the Corn & Cotton Planter To all whom these presents shall come Be it known that I George C
Boyd of the Township of New London in the County of Chester and State
of Pennsylvania have invented a new and useful machine for plan
ting Corn and Cotton called the Corn and Cotton Planter, and that
the following is a full and exact description thereof, which with the accompa
nying drawings and models will enable any person fully to understand
and use the same. It consists of a frame upon which is a hopper and
a [illegible] on the [illegible] wheel about 21 inches in diameter attached
to the [illegible] surface of the right wheel is a large cast iron [illegible] wheel
which turns a small pinion made fast on the end of a shaft, which extends
across the frame directly under the hopper, on this shaft is a wheel which
works up into the bottom of the hopper to fit closely to prevent the escape
of the grain except at a notch in the face of this wheel into which it
is admitted at any moment to escape in quantities of 2, 3 or 4 grains
which is regulated by a sliding gate, to prevent the [illegible] from [illegible] or
[illegible] the seed a [illegible] of [illegible] [illegible] is attached to the [illegible] of the
sliding gate [illegible] to press against the [illegible] wheel
by a spring. The size of the pinion may be varied to regulate the distance
at which the grains are to be dropped apart. The [illegible] [illegible] the seed [illegible]
[illegible] apart. [illegible] the [illegible] wheel contains [illegible] teeth and being fast
on the [illegible] wheel [illegible] the same [illegible] one for every [illegible]
[illegible] the pinion contains 84 [illegible] [illegible]
[illegible] divided by 12 gives [illegible]
[illegible] wheel having [illegible]

9580X opsite sides will let the seed drop [illegible] [illegible] [illegible] [illegible] [illegible]
strokes. Before the [illegible] [illegible] [illegible] a tooth to make a small furrow
to receive the seed and at a proper distance behind it one or two teeth
[illegible] to cover the seed. The machine [illegible] by [illegible] [illegible]
to the [illegible] [illegible] [illegible] [illegible] handles [illegible] the [illegible] of the ground
[illegible] [illegible] the machine may be enlarged so as to [illegible] two or three rows
at one time. What I claim as my own invention and not previously
known is the above described machine to the [illegible] [illegible] [illegible]
the seed from [illegible] the hopper and for regulating the distance at which it is
to be dropped. March [illegible] 1806.

Witnesses
John Biga M.D.
A. P. [illegible]

George C. Biga

532

Patented April 11. 1806.

Drawing